United States Patent Office 3,268,455
Patented August 23, 1966

3,268,455
ACIDIC DENTURE CLEANING COMPOSITION
Douglas Maxwell Bryce and Ann Sudbury, Nottingham, England, assignors to Boots Pure Drug Company Limited, Nottingham, England, a British company
No Drawing. Filed Aug. 20, 1962, Ser. No. 218,139
Claims priority, application Great Britain, Aug. 3, 1961, 30,422/61
5 Claims. (Cl. 252—142)

This invention relates to improvements in cleansing compositions. More particularly it relates to acid compoistions for the cleansing of dentures. It also relates to a method of removing scale from dentures.

Denture cleansers fall mainly into two types, namely, alkaline preparations containing oxidizing agents and acid compositions. The alkaline compositions attack mucoprotein deposits and the oxidizing agents contained therein bleach many types of stain but such compositions suffer from their inability to dissolve mineral deposits of tartar. Acid compositions which dissolve tartar deposits have been used and they usually consist of aqueous solutions of hydrochloric acid which are brushed onto the dentures. Such compositions are effective but suffer from several disadvantages. Accidental contamination by spraying during brushing or by spillage may be unnoticed and cause damage to clothing and corosion of metalwork if untreated. Furthermore, a liquid preparation is not convenient for carrying about and may cause damage by leakage from the container during transportation.

It is an object of this invention to provide denture cleansing pastes based on acids or acid releasing compounds. It is a further object of the invention to provide acid pastes which are stable and non-corrosive under substantially anhydrous conditions but which release acid in contact with water. It is a further object of this invention to provide a method of removing scale from dentures by the use of acid cleansing pastes.

We have no discovered that greatly improved acid denture cleansing compositions in paste form may be prepared from two main types of acid or acid producing compound. For use in such pastes it is preferable that the acid ingredient be a solid, readily soluble in water yet not hygroscopic to any great extent. As an example of a free acid we have found that sulphamic acid is particularly suitable and is much less corrosive than hydrochloric acid based compositions. Where an acid producing substance is utilized, this may be in the form of a slat which releases acid in the presence of water. Betaine hydrochloride is an example of such an easily hydrolyzed salt which is stable when dry and when formulated in anhydrous pastes does not corrode metal tube containers.

According to the present invention, there is provided a method of cleansing dentures by treatment with a composition comprising as active ingredient sulphamic acid or betaine hydrochloride. There are also provided denture cleansing pastes comprising as active ingredient sulphamic acid or betaine hydrochloride.

The denture cleansing pastes according to the invention comprises the acid or acid producing compound preferably in a concentration of 2.5–80% w./w. in a hydrous or subtsantially anhydrous base. The preferred compositions comprise the acid or acid producing compound carried in solution or suspension in a water-miscible non-ionizing liquid diluent. We have found that a base comprising a mixture of polyethylene glycols or glycerol containing a proprietary thickening agent available under the trade name "Polawax" give pastes with excellent qualities.

In addition to the main acid ingredients and the paste forming base, the pastes according to the invention may contain additional agents to improve the cleansing efficiency, the appearance or the stability of the preparations provided that they are compatible with the main acid ingredients.

It is desirable, but not essential, to include up to 10% w./w. of a surfactant to remove any fat contaminating the dentures and improve the contact of the acid ingredient with the dental tartar. The preferred surfactants are anionic agents such as sodium lauryl sulphate and dodecyl benzene sodium sulphonate. Non-ionic surfactants such as ethoxylated alkyl phenols and polyoxyethylene monostearate may also be used but their foaming properties are generally inferior to those of the anionic agents. There may also be included to 10% w./w. of spreading agents and adhesives such as cetyl alcohol, up to 10% of anti-slip agents such as calcium silicate and up to 10% of pigments. We prefer to include a dense white pigment such as titanium dioxide which helps to show if accidental splashing during brushing of the dentures has contaminated clothing or metal with the acid composition. Improved milling of the paste may be achieved by the inclusion of up to 2% of lecithin and the consistency of the final paste may be improved by the inclusion of up to 5% of silicones. Color stabilizers may be incorporated if desired; we have found that urea in a concentration of up to 10%, preferably about 5%, is particularly effective in preventing the discoloration of pastes containing sulphamic acid.

Up to 10% w./w. of a mild abrasive may be included, typical examples being mica, silicates and kiesselguhr. The substantially anhydrous nature of the preferred pastes may be ensured by the inclusion of a suitable desiccant such as exsiccated sodium sulphate.

The following non-limitative examples illustrate the invention.

*Example 1*

A denture cleansing paste was prepared from the following ingredients:

| | Percent w./w. |
|---|---|
| Sulphamic acid | 25 |
| Sodium lauryl sulphate | 2 |
| Cetyl alcohol | 2 |
| Calcium silicate | 2 |
| Titanium dioxide | 1 |
| Polyethylene glycol 1500 | 10 |
| Polyethylene glycol 400 to make 100% w./w. | |

*Example 2*

A denture cleansing paste was prepared from the following ingredients:

| | Percent w./w. |
|---|---|
| Sulphamic acid | 35.0 |
| Titanium dioxide | 1.0 |
| Sodium lauryl sulphate | 2.0 |
| Lecithin | 0.5 |
| Citric acid | 0.5 |
| Exsiccated sodium sulphate | 2.0 |
| Glycerol | 28.5 |
| 10% Polawax (a proprietary thickening agent) in glycerol | 30.0 |

*Example 3*

A denture cleansing paste was prepared from the following ingredients:

| | Percent w./w. |
|---|---|
| Betaine hydrochloride | 25.0 |
| Titanium dioxide | 1.0 |
| Sodium lauryl sulphate | 2.0 |
| Lecithin | 0.5 |
| Cetyl alcohol | 2.0 |
| Polyethylene glycol 1500 | 10.0 |
| Polyethylene glycol 400 to make 100% w./w. | |

Example 4

A denture cleansing paste was prepared from the following ingredients:

| | Percent w./w. |
|---|---|
| Sulphamic acid | 25.0 |
| Titanium dioxide | 1.0 |
| Lecithin | 0.5 |
| Sodium lauryl sulphate | 2.0 |
| Abrasive | 10.0 |
| Polyethylene glycol 1500 | 8.0 |
| Polyethylene glycol 400 to make 100.0% w./w. | |

Example 5

A denture cleansing paste was prepared from the following ingredients:

| | Percent w./w. |
|---|---|
| Sulphamic acid | 25.0 |
| Titanium dioxide | 1.0 |
| Lecithin | 1.0 |
| Sodium lauryl sulphate | 2.0 |
| Abrasive | 10.0 |
| Polawax (a proprietary thickening agent) | 3.0 |
| Sodium sulphate | 2.0 |
| Citric acid | 0.5 |
| Glycerol, to make 100.0% w./w. | |

Example 6

A denture cleansing paste was prepared from the following ingredients:

| | Percent w./w. |
|---|---|
| Sulphamic acid | 25.0 |
| Titanium dioxide | 1.0 |
| Dodecyl benzene sodium sulphonate | 2.0 |
| Aerosil | 1.0 |
| Polyethylene glycol 400 | 31.0 |
| Polyethylene glycol 1500 | 40.0 |

Example 7

A denture cleansing paste was prepared from the following ingredients:

| | Percent w./w. |
|---|---|
| Sulphamic acid | 25.0 |
| Titanium dioxide | 1.0 |
| Myrj 49 (a trade name for a polyethylene glycol stearate) | 2.0 |
| Cetyl alcohol | 2.0 |
| Polyethylene glycol 1500 | 10.0 |
| Polyethylene glycol 400 to make 100.0% w./w. | |

Example 8

A denture cleansing paste was prepared from the following ingredients:

| | Percent w./w. |
|---|---|
| Betaine hydrochloride | 50.0 |
| Titanium dioxide | 1.0 |
| Sodium lauryl sulphate | 2.0 |
| Lecithin | 1.0 |
| Exsiccated sodium sulphate | 2.0 |
| Polyethylene glycol 1500 | 6.0 |
| Polyethylene glycol 400 | 38.0 |

Example 9

A denture cleansing paste was prepared from the following ingredients:

| | Percent w./w. |
|---|---|
| Betaine hydrochloride | 50.0 |
| Titanium dioxide | 1.0 |
| Lecithin | 1.0 |
| Sodium lauryl sulphate | 2.0 |
| 10% Polawax (a proprietary thickening agent) in glycerol | 20.0 |
| Glycerol | 26.0 |

Example 10

A denture cleansing paste was prepared from the following ingredients:

| | Percent w./w. |
|---|---|
| Sulphamic acid | 50.0 |
| Titanium dioxide | 2.0 |
| Sodium lauryl sulphate | 2.0 |
| Lecithin | 1.0 |
| Exsiccated sodium sulphate | 2.0 |
| Citric acid | 0.5 |
| Polawax (a proprietary thickening agent) | 2.0 |
| 0.5% soln. of Edicol Supra Ponceau 4RS (a proprietary coloring agent) | 1.0 |
| Glycerol to make 100.0% w./w. | |

Example 11

A denture cleansing paste was prepared from the following ingredients:

| | Percent w./w. |
|---|---|
| Sulphamic acid | 75.0 |
| Titanium dioxide | 1.0 |
| Sodium lauryl sulphate | 2.0 |
| Lecithin | 1.0 |
| Glycerol to make 100.0% w./w. | |

Example 12

A denture cleansing paste was prepared from the following ingredients:

| | Percent w./w. |
|---|---|
| Sulphamic acid | 50.0 |
| Titanium dioxide | 2.0 |
| Soidum lauryl sulphate | 2.0 |
| Lecithin | 1.0 |
| Exsiccated sodium sulphate | 2.0 |
| Citric acid | 0.5 |
| Polawax (a proprietary thickening agent) | 3.0 |
| Urea | 5.0 |
| Glycerol to make 100.0% w./w. | |

Example 13

A denture cleansing paste was prepared from the following ingredients:

| | Percent w./w. |
|---|---|
| Sulphamic acid | 50.0 |
| Titanium dioxide | 2.0 |
| Sodium lauryl sulphate | 2.5 |
| Lecithin | 1.0 |
| Exsiccated sodium sulphate | 2.0 |
| Citric acid | 0.5 |
| Polawax (a proprietary thickening agent) | 3.0 |
| Silicone | 2.0 |
| Glycerol to make 100.0% w./w. | |

Example 14

A denture cleansing paste was prepared from the following ingredients:

| | Percent w./w. |
|---|---|
| Sulphamic acid | 50.0 |
| Titanium dioxide | 1.0 |
| Sodium lauryl sulphate | 2.0 |
| Lecithin | 1.0 |
| Polyethylene glycol 1500 | 8.0 |
| Polyethylene glycol 400 to make 100.0% w./w. | |

We claim:

1. An acid denture cleansing paste consisting essentially of 2.5–80% by weight of a compound selected from the group consisting of betaine hydrochloride and sulphamic acid, as the active acid denture cleaning agent, and an anhydrous diluent selected from the group consisting of glycerol and a mixture of polyethylene glycol 1500 and 400 compatible with said acid cleansing agent as the paste base.

2. A composition as in claim 1 also containing exsiccated sodium sulfate as a desiccating agent.

3. A composition as in claim 1 also containing sodium lauryl sulphate as a surface active agent.

4. A composition as in claim 1 also containing dodecyl benzene sodium sulphonate as a surface active agent.

5. A composition as in claim 1 also containing urea as a color stabilizer.

References Cited by the Examiner

UNITED STATES PATENTS

| | | | |
|---|---|---|---|
| 2,393,866 | 1/1946 | Wassel | 252—145 XR |
| 2,542,518 | 2/1951 | Henschel. | |
| 2,994,664 | 8/1961 | Wachter | 252—142 XR |
| 3,042,621 | 7/1962 | Kirschenbauer | 252—142 XR |

FOREIGN PATENTS 686,429   1/1953   Great Britain.

OTHER REFERENCES

Bennett: "The Chemical Formulary," Chem. Publishing Co., vol. 6, p. 60.

LEON D. ROSDOL, *Primary Examiner.*

JULIUS GREENWALD, *Examiner.*

J. D. WELSH, *Assistant Examiner.*